United States Patent [19]

Tyrsted

[11] 4,352,472
[45] Oct. 5, 1982

[54] SYSTEM FOR DETECTION OF TAPE THICKNESS IN TAPE RECORDERS OR PLAYERS

[75] Inventor: Ivan Tyrsted, Struer, Denmark

[73] Assignee: Bang and Olufsen A/S, Struer, Denmark

[21] Appl. No.: 205,326

[22] PCT Filed: Jan. 10, 1980

[86] PCT No.: PCT/DK80/00004
§ 371 Date: Sep. 10, 1980
§ 102(e) Date: Sep. 10, 1980

[87] PCT Pub. No.: WO80/01522
PCT Pub. Date: Jul. 24, 1980

[30] Foreign Application Priority Data

Nov. 1, 1979 [GB] United Kingdom ............... 7901060

[51] Int. Cl.³ .................. G03B 1/04; G11B 15/32; B65H 59/38
[52] U.S. Cl. ................................ 242/186; 242/191
[58] Field of Search .................. 242/186–191; 317/7; 360/71, 73, 137; 33/133, 140

[56] References Cited

U.S. PATENT DOCUMENTS 3,834,648 9/1974 Rose et al. .................. 242/186
4,172,231 10/1979 d'Alayer de Costemore d'Arc .................... 318/7
4,280,159 7/1981 Nakayama .................. 360/137

FOREIGN PATENT DOCUMENTS 2157570 5/1973 Fed. Rep. of Germany.
2416060 10/1975 Fed. Rep. of Germany.
2650665 10/1978 Fed. Rep. of Germany.

Primary Examiner—Leonard D. Christian
Attorney, Agent, or Firm—Antonelli, Terry & Wands

[57] ABSTRACT

A tape recorder which comprises indicator means for the progress of the tape on a true playing time basis, also during fast winding, makes use of a system for measuring the speed of rotation of at least one of the tape reels, whereby the speed or a counted number of revolutions will be indicative of the tape position when the thickness of the tape known. According to the invention the thickness is measured automatically by means of the same system, based on timely spaced measurements of the speed of rotation and knowledge about the length of tape having been reeled in the meantime. This length may be measured in a direct manner, but it is preferred to calculate it automatically based on the lapse of time and the known standard playing speed. The recorder comprises the necessary processor equipment for automatically calculating the tape thickness on this basis and reading the resulting measuring result as a tape type selector signal into the main control unit of the recorder.

9 Claims, 1 Drawing Figure

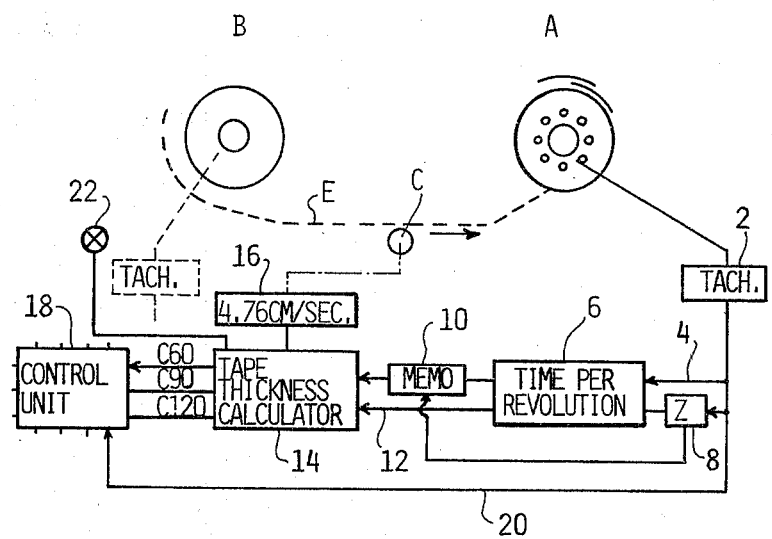

SYSTEM FOR DETECTION OF TAPE THICKNESS IN TAPE RECORDERS OR PLAYERS

The present invention relates to cassette tape recorders and more particularly to a system for detection of the playtime type of standard tape cassettes in tape recorders or players of the type having means for detecting the angular velocity of at least one of the reels for enabling automatic control or display functions to be effected, at least partly based on the detection result as to the playtime type, i.e. the tape thickness, of the cassette.

Advanced tape recorders as disclosed e.g. in U.S. Pat. No. 3,834,648 and DE-OS No. 26 50 665 comprise detector and calculator means operable to steadily register the movements of the tape, during playing, recording or fast winding, and effect a digital displaying of the tape position based on a true playing time basis. Several functions such as automatic fast forward winding or rewinding to a desired tape position are hereby obtainable in an easy manner.

The tape position, of course, is correlated with the degree of tape filling of either of the two reels, i.e. with the reel radius of each one of the reels. This radius can be measured rather accurately by detecting, e.g. by a tachometer, the angular velocity of the reel and another velocity, viz. either (1) the speed with which the tape is reeled on or off or (2) the angular velocity of the opposite reel. It can be demonstrated, as already well known, that at least the relative tape position can be automatically calculated from such two simultaneous detection results, when the thickness of the tape is known.

In these advanced tape recorders, therefore, it is sufficient to read into the control device the necessary information as to the thickness of the tape to be used, whereafter the various control or display functions relating to the tape position can be effected automatically. A simple way, of course is to arrange for a manually operable selector which can be preset in accordance with the cassette type to be used; according to normal standards the audio cassettes are marked with a maximum playing time of e.g. 60, 90 or 120 minutes, corresponding to respective thicknesses and lengths of the tape for enabling each "side" of the cassette to show a playing time of 30, 45 and 60 minutes, respectively. It is even known to provide for automatic selection by preparing the cassettes with relevant indicator means and the tape recorder with means for sensing the indicator means of the cassettes, whereby the user need not care about the tape thickness information.

However, it seems difficult for the manufacturers of cassettes and recorders, respectively, to agree on some universal standards in this respect, and, besides, it even seems difficult for the manufacturers of cassettes to fully standardize the cassettes with respect to tape length and thickness and playtime marking. Thus, a cassette of the "90 min" type may contain a shortened length of thin tape as adapted for use in a standard "120 min" cassette, and a playtime marking may show "60+15 min" without an indication as to the actual thickness of the tape used.

It is the purpose of this invention to provide a tape recorder of the type referred to, which is provided with means for determining the thickness of the tape to be used without relying on manual selection or on automatic selection based on indicator means on the cassettes.

According to the invention the recorder (and/or player) comprises control means for actuating said angular velocity detecting means of a reel during a first short interval of time and thereafter again during a second short interval of time timely spaced from the first interval, means for memorizing at least the first detection result, and calculator means for calculating the tape thickness based on the two detection results and the linear velocity of the tape or corresponding detection results referring to the other reel.

In connection with the invention it is recognized that while as well known it is possible to detect by way of the reel rotation the tape displacement between two spaced measuring instances or short measuring intervals, when the tape thickness is known, it is equally possible in a simple manner to detect the tape thickness by two timely spaced measurements of the reel rotation, when the other relevant parameters are known. In practice it has been found sufficient for obtaining a reasonably accurate thickness detection that the short measuring intervals, e.g. each defined by one revolution of the reel in question, are spaced corresponding to few revolutions only of the reel, i.e. even with ordinary play speed of the tape the detection system will be able to detect the tape thickness shortly after the start of a new cassette. In the meantime, until the detection system is able to feed the thickness detection result into the control unit, the indicator display of the tape recorder may be caused to provide indication to the user that it has not yet been possible to fix any absolute or relative zero point of the tape position as a basis for a reliable position indication, while as soon as the detection result is ready the display is caused to show the user that from now on there is established a zero point and a reliable time base for the indication of the movement of the tape. It will be understood that this showing may be effected in any of a wide variety of possible manners.

Preferably the thickness detection is carried out while the tape is moved at ordinary playing speed, while the detection is suspended by fast winding, and the user, therefore, may well insert a new cassette and immediately effect fast winding to some relevant tape position and then start recording or playing, whereby a relative tape zero position will be established soon thereafter. In the meantime the user may have the opportunity to listen in on the desired exact starting point. Of course, an absolute zero (starting) position may thereafter be established by rewinding of the tape to its starting point and causing the relevant negative tape position to be read into the control unit as a new zero point. Similarly or even additionally an absolute stop point may be read into the control unit, whereafter the tape may be rewound to any desired relative start position. If thereafter the control unit is informed of some desired following playing or recording time it may cause the display to indicate "rejection" if the particular time exceeds the available tape playing time. These operations of finding and reading in the start and/or stop end positions of the tape may well be controlled in an automatic manner upon insertion of the cassette or by manual actuation of a relevant control button.

It will be understood that the tape thickness detection may be obtained by various methods of determining, directly and/or indirectly, the relation between the relevant parameters. In a preferred arrangement the time interval between the two measurements of the angular velocity of the reel is determined by automatic counting of a predetermined full number, $Z$, of revolutions of the reel, and based on the known tape speed the angular velocity measurements are converted to a detection of the respective radii, $R_1$ and $R_2$, whereafter the tape thickness $T_t$ is calculated by the expression $$T_t = \frac{R_2 - R_1}{Z + 1}.$$

The respective angular velocities could well be determined by an instantaneous measurement, but it is preferred to measure them based on a tachometer counting during a short interval of time as defined by one reel revolution, this being a safe and simple method which is usable because the radius is practically constant during one revolution only.

In the following the invention will be described in more detail by way of example, with reference to the drawing, which is a diagram of a preferred system according to the invention.

In the drawing is schematically shown a tape recorder represented by two reels A and B and a capstan C. The tape is shown by a dotted line E. The reel A is the take-up reel during normal playing, and it is provided with a tachometer system 2 producing a number of, e.g. eight, pulses per revolution of the reel. The output of the tachometer is through a direct wire 4 fed to a unit 6 that is operable to calculate the "time per revolution", and further through a delay unit 8 to the same unit 6. The delay unit 8 is a revolution counter which serves to count a fixed number Z of, e.g. 25-100, full revolutions of the reel A and to reconnect the tachometer with the unit 6 upon this count being reached, whereafter the unit 6 again measures the time for one full revolution. The first "time revolution" result is fed to a memory unit 10 in which it is stored until, $Z+1$ revolutions later, the next "time per revolution" result occurs on another output wire 12 from the unit 6. Then the unit 10 releases the stored signal which is fed to a calculator unit 14 together with the signal from the wire 12, and the unit 14 is adapted so as to compare the respective angular velocities ("time per revolution") with the linear speed of the tape to determine the respective radii $R_1$ and $R_2$ and then calculate the tape thickness according to the said expression $$T_1 = \frac{R_2 - R_1}{Z + 1}.$$

Information as to the linear speed of the tape is in known devices derived from a tachometer arrangement connected with the capstan or other roller means passed by the moving tape. According to the invention, however, it is realized that the playing or recording speed of the tape in a tape recorder of a quality justifying the use of sophisticated calculator and microprocessor control means will be rather accurately adjusted to some international standard, commonly 4.76 cm/sec, and that for this reason it is in fact possible to obviate entirely any tape speed detector and in lieu thereof include in the calculator a simple logic unit representing the relevant standard tape speed, such a unit being shown at 16. This is an important separate aspect of the invention, because such a unit will be generally usable in lieu of a conventional tape speed detector.

The calculator 14 may determine the tape thickness without any high degree of accuracy, because normally the accuracy will be sufficient if the thickness can be detected as one of a few standard thicknesses, e.g. corresponding to tape of the C60, C90 or C120 type. One difficulty in detecting the thickness very accurately is that some air may be trapped between the reel windings, whereby the angular reel velocity will refer to a tape of slightly increased thickness, but the associated inaccuracy is not sufficient to cause a wrong standard thickness detection.

Thus, in the example shown the output signal of the calculator 14 may be indicative of a tape of either the C60, the C90 or the C120 type, and the signal is fed to the main control unit 18 of the recorder to produce the required tape selection function.

The control unit 18, which may be of the microprocessor type, may thereafter perform its relevant operations according to the design of the control and display equipment, but in this respect it is here deemed sufficient just to refer to the known recorders, because the invention primarily relates to the method and means for providing the necessary information as to the tape thickness. The tachometer 2 is shown connected direct to the control unit 18 through a wire 20, this because the same tachometer plays an important roll also during normal operation after the tape thickness has been determined. Also, the logic unit 16 is usable in normal operation to replace a tape play speed detector. The other reel 5 may be provided with a tachometer system just as reel A, and if a tachometer is used on both reels it would be possible to effect all calculation and control functions, even the determination of the tape thickness, based solely on the two tachometers i.e. without the use of a tape speed detector or the corresponding unit 16.

It will be appreciated that the invention is not necessarily limited to recorders or similar devices of the type adapted to receive tape enclosed in a cassette, but in practice the invention is presumably particularly relevant to just the cassette types, whether for audio, video or data type.

The calculator 14 may effect a display function such as switching on or off a lamp 22 in response to the occurence of the thickness selector signal to the control unit 18, or this unit may cause the same display function when it has effectively received the signal, to thereby indicate to the operator that from now on the display and control functions will be carried out in a correct manner with respect to indication of the tape position based on a true playing time basis.

In a manner not illustrated the recorder is so designed that the tape thickness selection in the control unit 18 is cancelled whenever the tape cassette is removed from its operative position, and a new thickness detection cycle starts when a new cassette has been placed in the operative position and a playing or recording function is initiated.

I claim:

1. A system for detection of the playtime type of a tape in tape players or recorders of the type having a means for detecting angular velocity of at least one reel and a main control means for effecting at least one of automatic control and display functions at least partially based upon the thickness of a tape being utilized, comprising:

control means for actuating said angular velocity detecting means during a first short interval of time and for subsequently reactuating said angular velocity detecting means during a second short interval of time;

memory means operatively associated with said angular velocity detecting means for receiving and storing an angular velocity output produced as a result of at least the actuation of the angular velocity detecting means during said first time interval;

playing velocity means for producing an output representative of the linear speed of said tape; and calculator means operatively associated with said memory means, said playing velocity means and said angular velocity detecting means for calculating the thickness of said tape based upon angular velocity output produced as a result of actuation of the angular velocity detecting means during both of said time intervals and upon linear speed output from said playing velocity means.

2. A system according to claim 1, wherein said playing velocity means comprises means for providing said linear speed output to said calculating means as a calculation constant unit corresponding to an international tape playing velocity standard.

3. A system according to claim 1, further comprising automatic counting means for controlling a lapse in time between said first and second time intervals by automatically counting a predetermined number of reel revolutions.

4. A system according to claim 3, wherein said automatic counting means comprises a means for controlling the length of said first and second time intervals by automatically counting a predetermined small number of reel revolutions.

5. A system according to claim 4, wherein said predetermined small number is one.

6. A system according to claim 1, further comprising automatic counting means for controlling the length of said first and second time intervals by automatically counting a predetermined small number of reel revolutions.

7. A system according to claim 6, wherein said predetermined small number is one.

8. A system according to claim 1, wherein said calculator means is operative to feed a tape thickness determination to said main control means, and further comprising display means operatively associated with said calculator means, said display means being responsive to the feeding of a said tape thickness determination to said main control means.

9. A system according to claim 1, wherein said playing velocity means is operative to produce said linear speed output based upon the angular velocity of the reels of the player or recorder.

* * * * *